United States Patent [19]

Katsurabayashi

[11] Patent Number: 5,530,880
[45] Date of Patent: Jun. 25, 1996

[54] COOPERATIVE OPERATION USING WORKSTATIONS HAVING OPERATIVE RIGHTS ASSIGNED

[75] Inventor: Hiroshi Katsurabayashi, Kanagawa, Japan

[73] Assignee: Fuji Xerox Co., Ltd., Tokyo, Japan

[21] Appl. No.: 357,347

[22] Filed: Dec. 15, 1994

Related U.S. Application Data

[63] Continuation of Ser. No. 928,360, Aug. 12, 1992, abandoned.

[30] Foreign Application Priority Data

Aug. 13, 1991 [JP] Japan .................................. 3-202981

[51] Int. Cl.⁶ .............................. G06F 12/14; G06F 3/14
[52] U.S. Cl. ...................... 395/800; 395/860; 395/600; 364/222.5; 364/232.9; 364/264; 364/286.4; 364/286.5
[58] Field of Search ...................... 395/800, 200, 395/725, 325, 860, 600; 364/DIG. 1

[56] References Cited

U.S. PATENT DOCUMENTS

| | | | |
|---|---|---|---|
| 4,532,507 | 7/1985 | Edson et al. ................... | 340/825.31 |
| 4,882,752 | 11/1989 | Lindman et al. .................. | 380/25 |
| 4,954,982 | 9/1990 | Tateishi et al. .................. | 364/900 |
| 4,974,173 | 11/1990 | Stefik et al. ..................... | 364/521 |
| 5,008,853 | 4/1991 | Bly et al. ......................... | 364/900 |
| 5,107,443 | 4/1992 | Smith et al. ..................... | 395/158 |
| 5,127,099 | 6/1992 | Zifferer et al. .................. | 395/725 |
| 5,163,147 | 11/1992 | Orita ................................ | 395/600 |
| 5,202,983 | 4/1993 | Orita et al. ...................... | 395/600 |
| 5,220,657 | 6/1993 | Bly et al. ......................... | 395/425 |
| 5,271,007 | 12/1993 | Kurahashi et al. .............. | 370/85.1 |
| 5,276,901 | 1/1994 | Howell et al. ................... | 395/800 |
| 5,297,278 | 3/1994 | Wang et al. ..................... | 395/600 |
| 5,339,389 | 8/1994 | Bates et al. ...................... | 395/153 |
| 5,353,398 | 10/1994 | Kitahara et al. ................. | 395/153 |
| 5,408,662 | 4/1995 | Katsurabayashi ............... | 395/650 |
| 5,428,795 | 6/1995 | Johnson et al. ................. | 395/728 |

FOREIGN PATENT DOCUMENTS 62-209610  9/1987  Japan.

OTHER PUBLICATIONS

"Beyond the Chalkboard: Computer Support for Collaboration and Problem Solving in Meetings," M. Stefik et al., Communications of the ACM, vol. 30, No. 1, Jan. 1987, pp. 32–47.

"Shared Hardware: A Novel Technology for Computer Support of Face to Face Meetings," David Halonen et al., Communications of the ACM, 089791-358-2/90/0004/0163, 1990, pp. 163–168.

M. Stefik et al., "WYSIWIS Revised: Early Experiences with Multiuser Interfaces," ACM Transactions on Office Information Systems, vol. 5, No. 2, Apr. 1987, pp. 147–167.

*Primary Examiner*—Meng-Ai An
*Attorney, Agent, or Firm*—Finnegan, Henderson, Farabow, Garrett & Dunner

[57] ABSTRACT

An information processing system for a cooperative operation in which a plurality of work stations including at least one common work station are connected to one another by means of a network. The information processing system includes a memory device for storing operation rights corresponding to operation issuing sources, an identification device for identifying whether an operation request is a whole operation mode or a limited operation mode in accordance with a storage content of the memory device when the operation request is issued from a certain operation issuing source with respect to a function of the common work station, and an execution device for executing all functions of the common work station corresponding to the operation request when the operation request is identified as the whole operation mode as a result of identification by the identification device, and for limiting the execution of the functions of the common work station when the operation request is identified as the limited operation mode.

11 Claims, 5 Drawing Sheets

| NAME OF USER | NAME OF WORK STATION | NAME OF COMMAND | OPERATION MODE | DISPLAY AREA |
|---|---|---|---|---|

| A | WS1 | COPY | WHOLE OPERATION | COMMON |
|---|---|---|---|---|

COOPERATIVE OPERATION USING WORKSTATIONS HAVING OPERATIVE RIGHTS ASSIGNED

This application is a continuation, of application Ser. No. 07/928,360, filed Aug. 12, 1992, now abandoned.

BACKGROUND OF THE INVENTION

The present invention relates to an information processing system for a cooperative operation, which is used to perform a cooperative operation by a plurality of operators by use of a plurality of work stations while sharing the same display information in common.

When an information processing device such as a work station or the like is used to execute an operation, it can be expected to improve operation efficiency if a plurality of operators are able to execute the operation cooperatively.

In Japanese Patent Unexamined Publication No. Sho. 62-209610, there is disclosed an information processing system which includes a plurality of position input means with respect to a common device so as to perform a cooperative operation.

Also, in a network in which a plurality of work stations are connected to one another, it is possible to share display information in common. For this reason, it has been conventionally known that a plurality of operators are able to perform a cooperative operation by use of this function. For example, it has been conventionally known that a plurality of cooperators execute a cooperative operation by performing their respective operations with respect to a window shared in common (see "WYSIWIS Revised: Early Experiences with Multi-user Interfaces," Transactions on Office Information Systems, Vol. 5, No. 2, April 1987, pp. 147–167 ACM Transactions on Office Information Systems).

Referring more particularly to this document, as shown in FIG. 3 of this application, in a network system in which a plurality of work stations 51 and 52 are connected through a network 53 to each other, respectively including processors 51a, 52a, keyboards 51b, 52b, mice 51c, 52c and displays 51d, 52d, there is a common window in the respective display screens of the displays 51d, 52d of the work stations 51, 52, and a cooperative operation is performed by use of the common window. Although not shown in FIG. 3, other work stations are also connected to the network 53.

FIG. 4 shows a common window 55, which is displayed on the display screens 54 of the displays 51d and 52d. Within the common window 55, there are displayed mouse cursors 56 and 57, which are operated by the respective operators. Also, there is displayed in the same common window 55 a pop-up menu 58, which is displayed as a result of the operations of the mouse cursors 56 and 57.

For example, if a user who uses the work station 51 inputs a certain opinion from a position specified by the mouse cursor 56, then the opinion is displayed on the other work stations as well and, therefore, for example, if a user of the work station 52 moves the mouse cursor 57 to a position shown in FIG. 4 to thereby input another opinion, then this opinion is also displayed within the common window 55. In this manner, if anyone executes an operation, then all other operators are able to see the result of the operation.

However, in the conventional cooperative operation system, one of the operators is able to execute a personal operation apart from the will of the whole operators and, therefore, in some cases, it has been difficult to execute the cooperative operation smoothly. For example, when a certain operator has moved data within the common window 55 to another place, other operators who need to see or use the data are not able to get the data because the data is not present in the common window 55 any more.

Also, when a specific operator has personally executed a hierarchical display command so as to confirm the hierarchical structure of information, then a window showing the hierarchical structure is displayed within the common window 55, which hides the information that other cooperators are need to see, so that the other operators are not able to get their necessary information.

As mentioned above, because one operator's operation can prevent other operators's operations, even if one of the operators has an operation to perform, the operator must obtain the approval of all other cooperators before the operator actually executes the operation, which results in a complicated operation. For at least this reason, it has been difficult to carry out the cooperative operations smoothly.

SUMMARY OF THE INVENTION

The present invention aims at eliminating the drawbacks found in the above-mentioned conventional cooperative operation system. Accordingly, it is an object of the invention to give operators different operation rights to thereby be able to execute their cooperative operation smoothly. Also, it is another object of the invention to prevent an operator's personal operation from obstructing the whole cooperative operation.

In order to attain the above objects, the present invention provides an information processing system for a cooperative operation in which a plurality of work stations including at least one common work station are connected to one another by means of a network, the information processing system including memory means for storing operation rights corresponding to operation issuing sources; identification means for identifying whether an operation request is a whole operation mode or a limited operation mode in accordance with a storage content of the memory means when the operation request is issued from a certain operation issuing source with respect to a function of the common work station; and execution means for executing all functions of the common work station corresponding to the operation request when the operation request is identified as the whole operation mode as a result of identification by the identification means, and for limiting the execution of the functions of the common work station when the operation request is identified as the limited operation mode.

DETAILED DESCRIPTION OF THE INVENTION

Description will hereinafter be given in detail of the characteristics of the invention by way of the preferred embodiments thereof with reference to the accompanying drawings.

Figure 1:
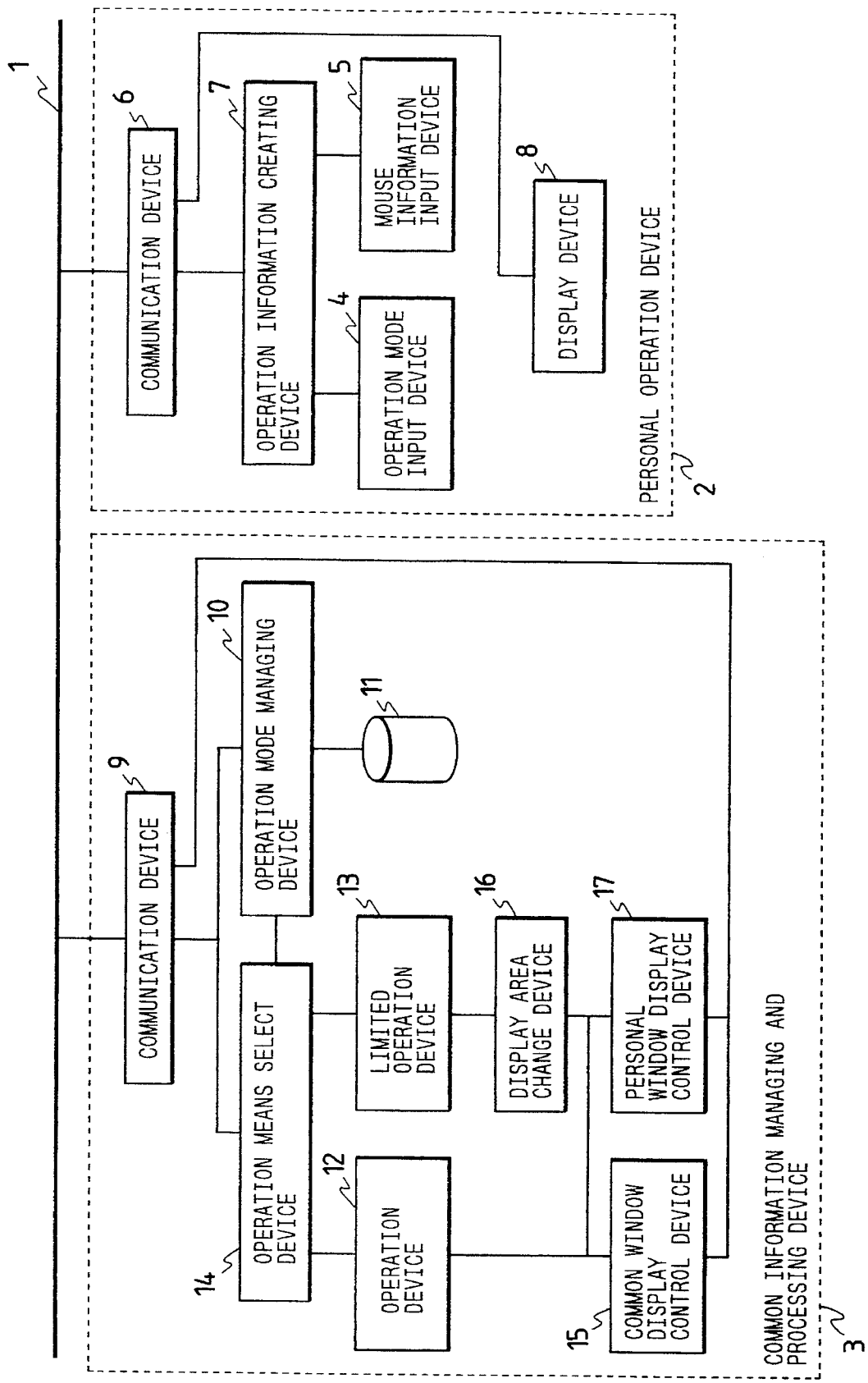
FIG. 1 is a schematic block diagram showing an embodiment of an information processing system for a cooperative operation according to the invention.

FIG. 1 shows a block diagram of an embodiment of an information processing system for a cooperative operation according to the invention.

A personal operation device 2 and a common information managing and processing device 3 are connected to a network 1. It should be noted here that a plurality of personal operation devices 2 may be connected to the network 1 according to demand.

Each of the personal operation devices 2 is composed of, for example, an ordinary work station, which includes an operation mode input device 4 such as a keyboard or the like, a mouse information input device 5, an operation information creating device 7 which creates operation information in accordance with input information from these input devices 4 and 5 and transmits the operation information through a communication device 6 to the network 1, and a display device 8 which displays the information that is received from the network 1.

Further, the common information managing and processing device 3 includes a communication device 9 which transmits and receives information to and from the network 1, an operation means select device 14 which receives the operation information that is transmitted from the personal operation device 2 and, by referring to a memory device 11 through an operation mode managing device 10, transmits the operation information to an operation device 12 or a limited operation device 13 according to the content of the operation information received, a common window display control device 15 connected to the operation device 12, and a personal window display control device 17 which is connected through a display area change device 16 to the limited operation device 13. Here, the memory device 11 holds operation mode management table as shown in Table 1.

TABLE 1

| Name of User | Name of Work Station | Operation Right |
|---|---|---|
| A | WS1 | Whole Operation |
| B | WS2 | Limited Operation |
| C | WS3 | Limited Operation |
| D | WS4 | Whole Operation |
| E | WS4 | Limited Operation |
| A | WS5 | Limited Operation |

Table 1 means, for example, that an operation right to perform a whole operation is set to a work station named "WS1" to be used by an operator having a user's name "A", and an operation right to perform a limited operation is set to a work station named "WS2" to be used by an operator having a user's name "B". In the same work station WS4, if the name of the user is "E", then the limited operation is authorized. If the A user uses other work station WS5, however, then only the limited operation can be authorized. Here, the term "operation right of the whole operation" means a right that makes it possible to operate all of the functions of work stations shared in common, while the term "operation right of the limited operation" means a right that makes it possible to operate only a part of the functions of work stations shared in common.

Also, the above-mentioned memory device 11 holds an allowable mode definition table as shown in Table 2.

TABLE 2

| Name of Command | Allowable Mode | Display Area |
|---|---|---|
| Copy | Whole Operation and Limited Operation | Personal Area |
| Move | Whole Operation | Common Area |
| Search | Whole Operation and Limited Operation | Personal Area |
| Substitute | Whole Operation | Common Area |
| Hierarchy Display | Whole Operation and Limited Operation | Personal Area |
| Rotate | Whole Operation | Common Area |
| Register | Whole Operation | Common Area |
| Close | Whole Operation | — |
| Card Preparation | Whole Operation and Limited Operation | Personal Area |
| Label Preparation | Whole Operation and Limited Operation | Common Area |
| Classify | Whole Operation | Common Area |
| Arrange | Whole Operation | Common Area |
| Change of Display Method | Whole Operation | Common Area |
| Environmental Setting | Whole Operation | Common Area |
| Retain | Whole Operation | Common Area |
| Fetch | Whole Operation | Common Area |
| End | Whole Operation | Common Area |
| Documentation | Whole Operation | Common Area |
| Edit | Whole Operation and Limited Operation | Personal Area |
| Select | Whole Operation and Limited Operation | Common Area |
| Size Change | Whole Operation | Common Area |
| Unlocking | Whole Operation | Common Area |
| Delete | Whole Operation | Common Area |
| Change of Card Type | Whole Operation | Common Area |
| Display of Structure | Whole Operation and Limited Operation | Personal Area |
| Page Allocation | Whole Operation | Common Area |
| Fair Copy of Red Line | Whole Operation | Common Area |

In Table 2, for example, a copy command makes it possible to execute an operation requested from an operation issue source that has an operation right to perform either the whole operation or the limited operation, and the execution result is displayed in a personal window. When a move command is given, then it is possible to execute only an operation requested from an operation issue source which has an operation right to perform the whole operation, and the execution result is displayed in a common window.

Next, description will be given below of the operation of the above-mentioned information processing system for a cooperative operation by use of flow charts respectively shown in FIGS. 5 and 8.

At first, an operator selects an operation mode from the operation mode input device 4 of the personal operation device 2 shown in FIG. 1. The operation mode selected is transmitted to the operation mode managing device 10 of the common information managing and processing device 3 (Step S1 in FIG. 5).

Figure 5:
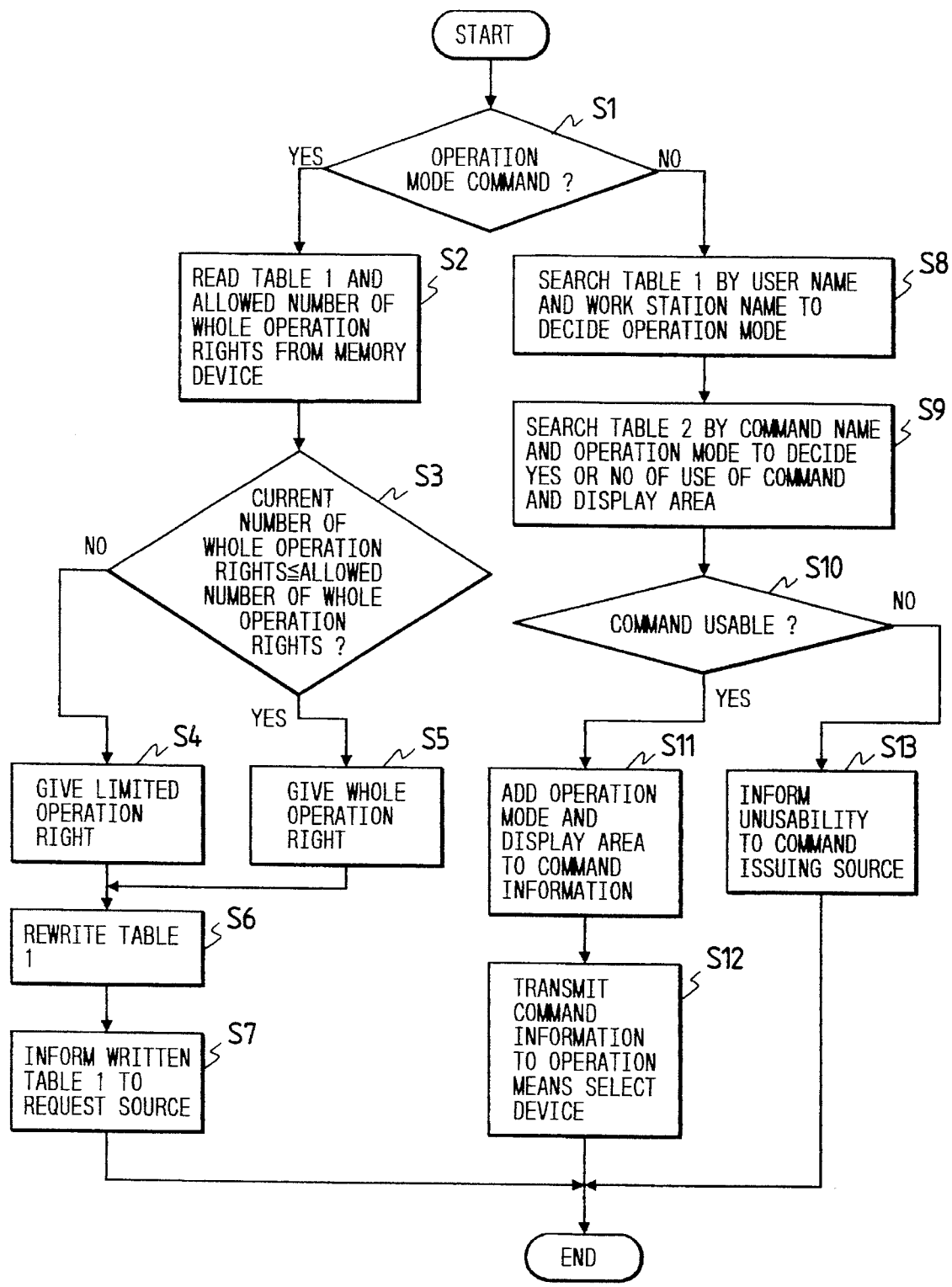
FIG. 5 is a flow chart to explain the operation of the information processing system for a cooperative operation of the invention.

Responsive to this, the operation mode managing device 10 reads therein Table 1 and the allowed number of the whole operation rights from the memory device (Step S2 in FIG. 5), and decides whether the whole operation right or limited operation right is to be given in accordance with a result of comparing the current number of the whole operation rights with the allowed number of the whole operation rights (Step S3 in FIG. 5). As a result, the whole operation right or the limited operation right is given (Step S4 or S5 in FIG. 5), the contents of Table 1 are rewritten (Step S6 in FIG. 5), and further the rewritten contents of Table 1 are transmitted to the display device 8 in the personal operation device 2 (Step S7 in FIG. 5).

In the present embodiment, two operation modes are available: a whole operation mode and a limited operation mode. A user who is authorized to the whole operation mode is able to perform all operations with respect to the information that is displayed in the common window of the display device, while a user authorized only for the limited operation mode is able to perform only the limited operation.

In the operation information creating device 7, there are added the names of users, the names of work stations and the like to the operation mode information input therein from the operation mode input device 4, and the resultant information is then transmitted to the network 1 by means of the communication device 6. Such information is transferred, for example, in a packet form.

By means of the above-mentioned operations, the operation mode is set with respect to each of the users or each of the work stations.

Next, if mouse information for a cooperative operation is input from the mouse information input device 5 of the personal operation device 2, then in the operation information creating device 7 there are added the names of users, the names of work stations and the like to such mouse information and the resultant information is then transmitted through the network 1 to the operation mode managing device 10 in the common information managing and processing device 3 by means of the communication device 6.

Figures 6, 7, 8:
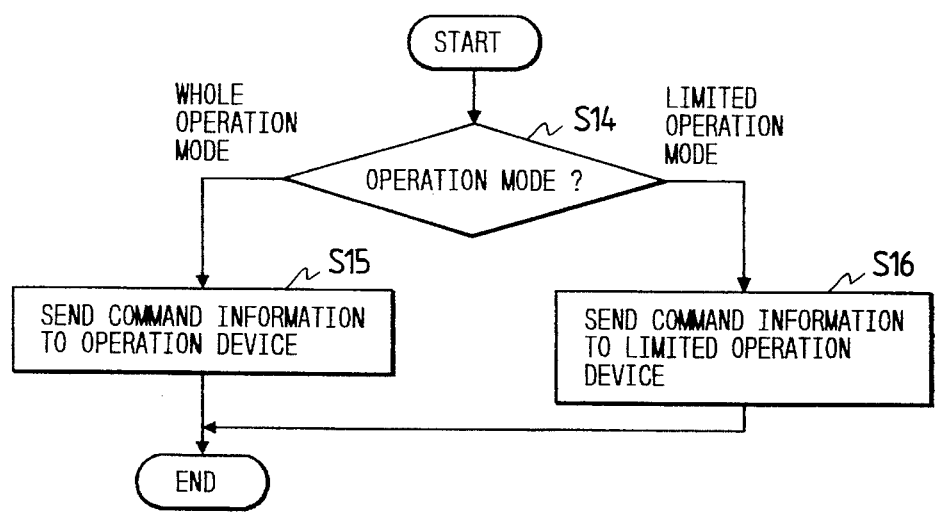
FIG. 6 is a view of the structure of command information employed in the invention.
FIG. 7 is a view of an example of the structure of the command information employed in the invention.
FIG. 8 is a flow chart to explain the operation of an operation means select device employed in the information processing system for a cooperative operation according to the invention.

FIG. 6 illustrates the structure of command information and FIG. 7 illustrates examples of command information.

Responsive to the input of the above information, the operation mode managing device 10 searches Table 1 by means of the information of the transmission source added to the mouse information, that is, the names of users and work stations, to thereby decide the operation mode (Step S8 in FIG. 5). Next, Table 2 is searched by means of the name of command and the operation mode to thereby decide whether the command and a display area are usable (Step S9 in FIG. 5) and thus to determine whether the command can be used or not (Step S10 in FIG. 5). If the command is usable, then the operation mode and display area are added to the command information (Step S11 in FIG. 5) and the command information is transmitted to the operation means select device 14 (Step S12 in FIG. 5). On the other hand, if the command is not usable, the issuing source of the command is notified that the commend is not usable (Step S13 in FIG. 5). In the operation means select device 14, it is checked whether the operation mode is the whole operation mode or limited operation mode (Step S14 in FIG. 8). As a result, if the operation mode is the whole operation mode, then the operation means select device 14 transmits the command information to the operation device 12 to thereby start the operation device 12 (Step S15 in FIG. 8). If the operation mode is the limited operation mode, then the select device 14 transmits the command information to the limited operation device 13 to thereby start the limited operation device 13 (Step S16 in FIG. 8).

For example, if mouse information is input from a work station named "WS2", then by referring to the operation mode management table shown in Table 1 it is determined that a limited operation mode is set for the work station, so that the operation device 13 is put into operation.

In a limited operation mode in which the limited operation device 13 operates, the kinds of executable commands are limited. In other words, as in the allowable mode definition table shown in Table 2, the copy command can be executed in either the whole or limited operation mode, but the move command cannot be executed in the limited operation mode.

Also, if an operation to be accompanied by display is executed while an operation is being executed in the limited operation mode, then a display area is checked with respect to the command by referring to the display area definition table (see Table 2) and, in accordance with the check result, display information is transmitted to the common window display control device 15 or to the personal window display control device 17.

Display signals respectively output from the two window display control devices 15 and 17 are supplied through the communication device 9, network 1 and communication device 6 to the personal operation device 2 and are then displayed on the display device 8.

Figure 2:
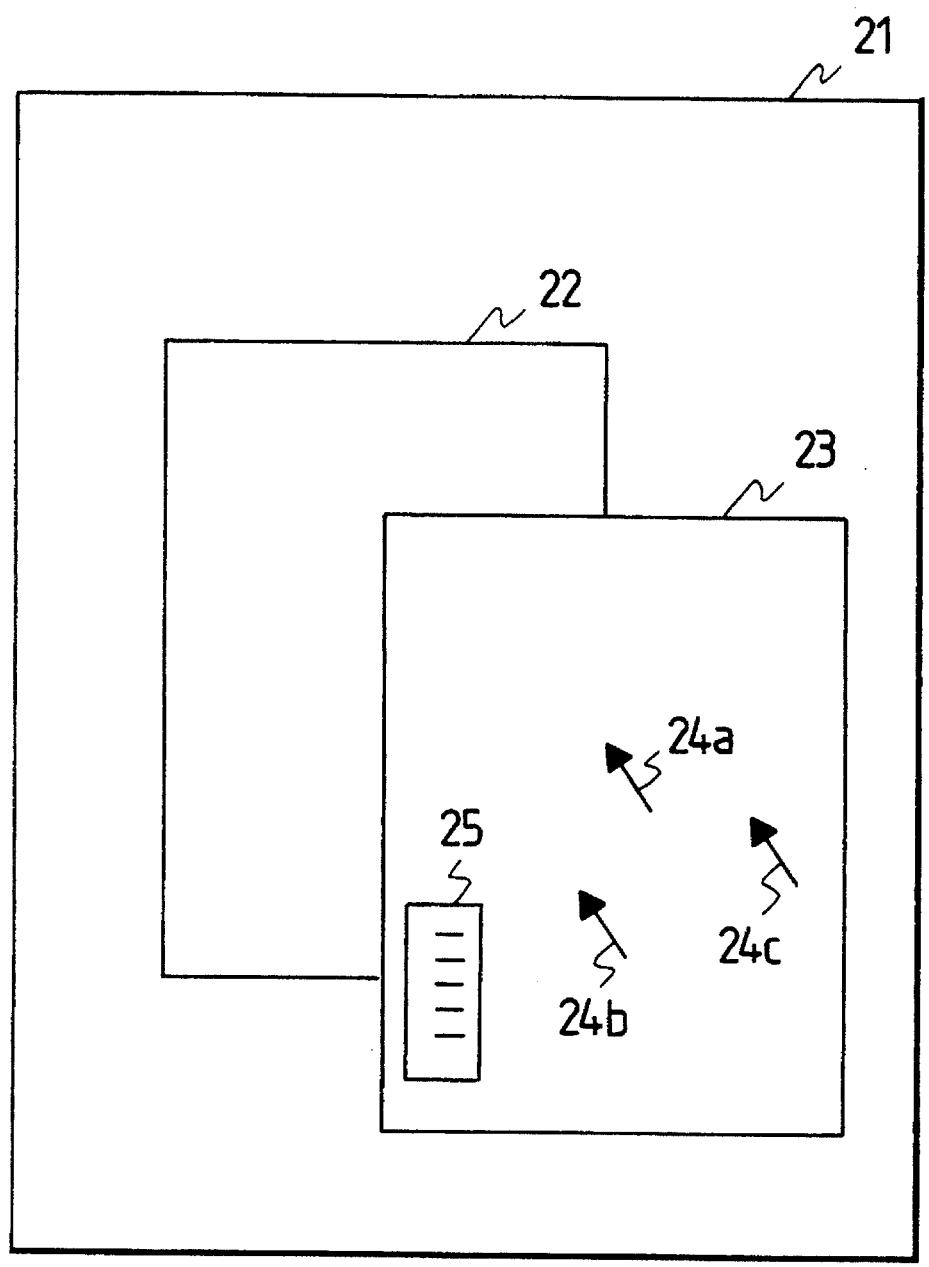
FIG. 2 an explanatory view showing an example of display of a personal window and a common window in a display device employed in the information processing system for a cooperative operation.
Figure 3:
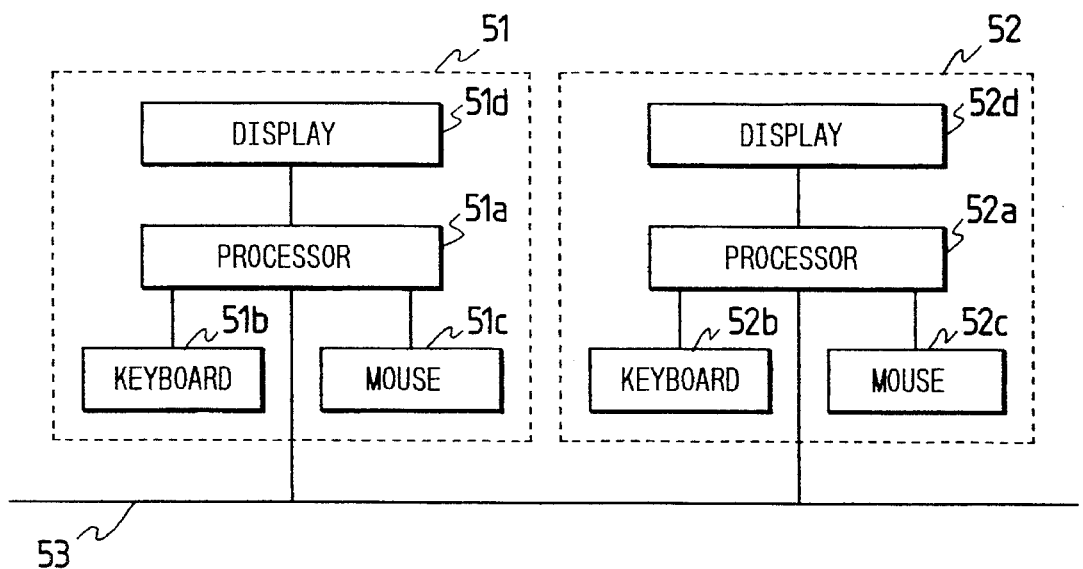
FIG. 3 is a schematic block diagram showing an example of the structure of a conventional information processing system for a cooperative operation.
Figure 4:
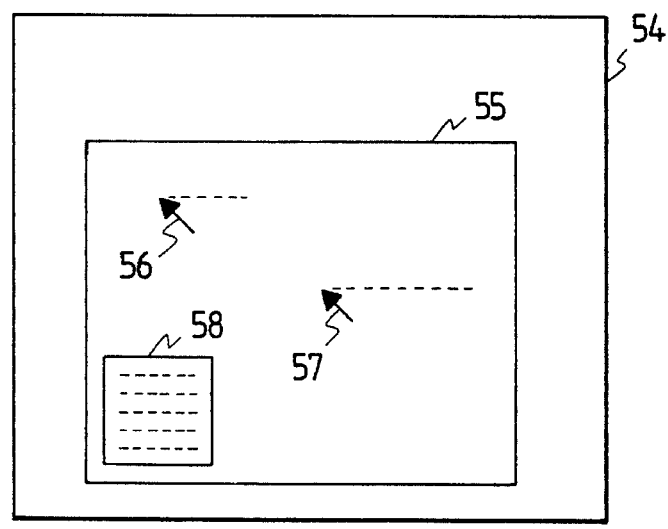
FIG. 4 is an explanatory view showing an example of display in a display device employed in the conventional information processing system for a cooperative operation.

FIG. 2 shows an example of a personal window 22 and a common window 23 respectively displayed on the display screen of the display device 8 and, in the common window 23, there are displayed a plurality of mouse cursors 24a, 24b and 24c including a mouse cursor which is adapted to move in accordance with the mouse information from the mouse information input device 5 in the personal operation device 2.

For example, the mouse cursor 24a is adapted to move on a display screen 21 in accordance with the mouse information from the mouse information input device 5. Further, a character string input from a keyboard or the like is displayed at and from a position which is specified by the mouse cursor 24a and a figure or the like is created in accordance with coordinates which are specified by the mouse cursor 24a. Other mouse cursors 24b and 24c are also operated similarly to the mouse cursor 24a. In FIG. 2, reference numeral 25 designates a pop-up menu which is used to select commands such as copy, move, search, and substitute commands which are shown in Table 2.

The following example assumes that the operation mode is the whole operation mode in a work station being used by an operator and a mouse cursor to be operated by the operator is the mouse cursor 24a. If the operator tries to execute, for example, a move operation among the pop-up menu 25 by use of the mouse cursor 24a, then, as can be seen from the allowable mode definition table shown in Table 2, the move operation can be executed because the work station for which the whole operation mode is set is allowed to execute a move operation, and the operation result is reflected on the common window 23.

Also, if a specific operator executes a hierarchical display command for personal confirmation, then a window showing the hierarchical structure is displayed only in the personal window. This eliminates the possibility that the common window can be covered with the window showing the hierarchical structure. As a result, the other cooperators will not be troubled by personal confirmation by the specific operator.

In the above-mentioned embodiment, the common and personal windows are displayed on the display device 8 in the personal operation device 2. However, this is not limiting but, alternatively, a large-sized display device which can be viewed by all cooperators may be connected to the common window display control device 15 in the common information managing and processing device 3 to thereby display a common window, and only the personal window may be displayed on the display device 8 in the personal operation device 2.

As has been described heretofore, according to the present invention, due to the fact that the right of operation with respect to the common data can be specified during the cooperative operation, there is eliminated the possibility that all cooperators can be disturbed by an operation to be executed by a specific person, and also a personal operation can be executed without giving any trouble to the other cooperators.

What is claimed is:

1. An information processing system for a cooperative operation in which a plurality of work stations including at least one common work station are connected to a network, wherein each of said work stations has a common display window for sharing common display information, and respective private display windows, said information processing system comprising:

first memory means for storing respective operation rights for operation request issuing sources at said work stations, said operation request issuing sources issuing operating requests to said common work station, said common work station performing respective functions in response to said operation requests, said operation rights including a first operation right and a second operation right;

second memory means for storing information on a first class of operation requests allowed only for said first operation right and a second class of operation requests allowed for both said first operation right and said second operation right;

first identification means for indirectly determining the operation rights for operation requests by identifying whether an operation request is issued from an operation request issuing source having said first operation right or issued from an operation request issuing source having said second operation right in accordance with a storage content of said first memory means;

second identification means for identifying a class of said operation request issued from the operation request issuing source in accordance with a storage content of said second memory means;

execution means for executing a function corresponding to an operation request issued from an operation request issuing source when said operation request is identified by said first identification means as issued from said operation request issuing source having said first operation right, for executing the function corresponding to said operation request when said operation request is identified by said second identification means that said operation request is of said first class and said operation request is identified by said first identification means as issued from said operation request source having said second operation right, and for preventing execution of a corresponding function to said operation request when said operation request is identified by said second identification means that said operation request is of said second class and said operation request is identified by said first identification means as issued from said operation request issuing source having said second operation right.

2. An information processing system as set forth in claim 1, wherein said first memory means stores said operation rights for names of users at said work stations, said users being said operation request issuing sources.

3. An information processing system set forth in claim 1, wherein said first memory means stores said operation rights for names of said work stations, said work station being said operation request issuing sources.

4. An information processing system set forth in claim 1, wherein said first memory means stores said operation rights for combinations of names of users and names of said work stations, said users at said work station being said operation request issuing sources.

5. An information processing system set forth in claim 1, wherein said first memory means further stores operation modes for said operation requests.

6. An information processing system as set forth in claim 1, wherein said first and second memory means are rewritable.

7. An information processing system as set forth in claim 1, further comprising decision means for deciding which kind of operation right is to be given for an operation request issuing source newly participating in said cooperative operation, in accordance with a number of operation issuing sources having said first operation rights.

8. An information processing system set forth in claim 1, wherein an execution result of said execution means is reflected on said common display windows when a display mode of said operation request is a first display mode, and wherein said execution result is reflected on a private display window of a work station corresponding to an operation request issuing source which issued said operation request when said display mode is a second display mode.

9. An information processing system set forth in claim 1, wherein said common work station includes a display device having a common display window to display common information.

10. An information processing system set forth in claim 9, wherein an execution result by said execution means is reflected on said common display windows when a display mode of said operation request is a first display mode, and said execution result is reflected on a private display device of a work station corresponding to an operation request issuing source which issued said operation request when said display mode is a second display mode.

11. An information processing system for a cooperative operation in which a plurality of work stations including at least one common work station are commonly connected to a network, said work stations each having a common display window and sharing common display information in said common display window, and further having respective private display windows, said information processing system comprising:

first memory means for storing respective operation rights for operation request issuing sources at said work stations, said operation request issuing sources issuing operation requests to said common work station, said common work station performing respective functions in response to said operation requests, said operation rights including a first operation right and a second operation right;

second memory means for storing respective display modes for said operation requests;

identification means for identifying whether an operation request is issued from an operation request issuing source having said first operation right or issued from an operation request issuing source having said second operation right in accordance with a storage content of said memory means;

first execution means for executing a function corresponding to an operation request issued from an operation request issuing source when said operation request is identified by said identification means as issued from said operation request issuing source having said first operation right, an execution result by said first execution means being reflected on said common display window when a display mode of said operation request is a first display mode, and said execution result being reflected on a private display window of a work station corresponding to said operation request issuing source which issued said operation request when the display mode is a second display mode;

second execution means for executing said function corresponding to said operation request when said operation request belongs to a first class and is identified by said identification means as issued from said operation request source having said second operation right, an execution result by said second execution means being reflected on said common display window when said display mode of said operation request is a first display mode, and said result being reflected on said private display window of work station corresponding to said operation request issuing source which issued said operation request when the display mode is the second display mode; and said second execution means preventing execution of said function corresponding to said operation request when said operation request belongs to a second class and is identified by said identification means as issued from said operation request issuing source having said second operation right.

* * * * *